(12) United States Patent
Liu

(10) Patent No.: US 11,086,365 B2
(45) Date of Patent: Aug. 10, 2021

(54) PROTECTIVE HOUSING FOR DISPLAY DEVICE OF PORTABLE EQUIPMENT

(71) Applicant: Wing Tak Lee Silicone Rubber Technology (Shenzhen) Co., Ltd, Guangdong (CN)

(72) Inventor: Tak Nam Liu, Guangdong (CN)

(*) Notice: Subject to any disclaimer, the term of this patent is extended or adjusted under 35 U.S.C. 154(b) by 878 days.

(21) Appl. No.: 15/871,840

(22) Filed: Jan. 15, 2018

(65) Prior Publication Data
US 2019/0220062 A1    Jul. 18, 2019

(51) Int. Cl.
*G06F 1/16*    (2006.01)
*H02H 9/04*    (2006.01)

(52) U.S. Cl.
CPC .......... *G06F 1/1656* (2013.01); *G06F 1/1616* (2013.01); *G06F 1/1637* (2013.01); *H02H 9/041* (2013.01); *G06F 2200/1633* (2013.01)

(58) Field of Classification Search
CPC .... G06F 1/1613; G06F 1/1615; G06F 1/1616; G06F 1/1618; G06F 1/162; G06F 1/1622; G06F 1/1624; G06F 1/1626; G06F 1/1628; G06F 1/163; G06F 1/1632; G06F 1/1633; G06F 1/1635; G06F 1/1637; G06F 1/1639; G06F 1/1641; G06F 1/1643; G06F 1/1645; G06F 1/1654; G06F 1/1656; G06F 1/1658; G06F 1/166; G06F 1/1669; G06F 1/1675; G06F 1/1677; G06F 1/1679; G06F 1/1681; G06F 1/1683; G06F 1/169; G06F 1/189; G06F 1/263; G06F 1/266; G06F 2200/1633; H02H 1/0007; H02H 3/16; H02H 5/083; H02H 9/041; H02H 9/046
See application file for complete search history.

(56) References Cited

U.S. PATENT DOCUMENTS

| D785,634 S   | * | 5/2017  | Iwamoto  | D14/434     |
|--------------|---|---------|----------|-------------|
| 9,652,002 B2 | * | 5/2017  | Hamann   | G06F 1/1626 |
| D795,859 S   | * | 8/2017  | Suzuki   | D14/315     |
| 9,971,385 B2 | * | 5/2018  | Mori     | E05B 65/0067|
| 10,073,492 B2| * | 9/2018  | Mori     | G06F 1/1679 |
| 10,095,274 B2| * | 10/2018 | Nakatani | G06F 1/1616 |
| 10,223,562 B2| * | 3/2019  | Itotani  | G06K 7/10722|

(Continued)

FOREIGN PATENT DOCUMENTS

| CN | 103812083 A  | * | 5/2014  |            |
|----|--------------|---|---------|------------|
| JP | 2002123337 A | * | 4/2002  |            |
| JP | 2007293400 A | * | 11/2007 | G09G 5/003 |

*Primary Examiner* — Jared Fureman
*Assistant Examiner* — Nicolas Bellido
(74) *Attorney, Agent, or Firm* — Rumit Ranjit Kanakia

(57) ABSTRACT

The present application provides a protective housing for a display device of a portable equipment, which comprises a surface cover, a surface cover plate, a frame body, a bottom case and a back plate, wherein a lower surface of the surface cover is detachably fixed on the frame body, a waterproof adhesive tape is arranged around the lower surface of the surface cover, the upper surface of the surface cover is fixed on the surface cover plate, a lower end of the frame body is fixed on the bottom case, a lower surface of the bottom case is fixed with an upper surface of the back plate, a corresponding end of the frame body is fixed with an adaption interface, an inner side of the adaption interface is arranged corresponding to a first connector of the display device.

8 Claims, 3 Drawing Sheets

(56) References Cited

U.S. PATENT DOCUMENTS

| | | | |
|---|---|---|---|
| 10,231,350 B2* | 3/2019 | Katsuyama | H05K 5/0247 |
| 10,349,544 B2* | 7/2019 | Katsuyama | H05K 5/0017 |
| 10,352,077 B2* | 7/2019 | Mori | H01M 50/20 |
| 10,359,811 B2* | 7/2019 | Katsuyama | H01R 13/629 |
| 10,606,311 B2* | 3/2020 | Shindo | G06F 1/166 |
| 2009/0009945 A1* | 1/2009 | Johnson | G06F 1/1613 |
| | | | 361/679.27 |
| 2011/0310553 A1* | 12/2011 | Hsiao | G06F 1/1616 |
| | | | 361/679.55 |

\* cited by examiner

PROTECTIVE HOUSING FOR DISPLAY DEVICE OF PORTABLE EQUIPMENT

TECHNICAL FIELD

The present application relates to the technical field of terminal accessories, and in particular, to a protective housing for a display device of a portable equipment.

BACKGROUND

A notebook computer (short for Note Book), also called a laptop computer (which can be called "Laptop" for short), is a small-size portable Personal Computer (PC). Generally, the notebook computer has a weight of 1 to 3 kilograms. The development of the notebook computer tends to be smaller and smaller in size and lighter and lighter in weight, but more and more powerful in function. The major difference among a Netbook, laptop computer and a PC is the portability thereof.

With the emergence of tablet computers, more and more users begin to use the tablet computers. For the sake of convenience, current notebook computers are provided with a technical scheme combining a tablet computer and a notebook computer; however, such technical scheme provides a poor protection for the part of the tablet computer in the notebook computer, and user experience is poor.

SUMMARY

The embodiments of the present application provide a protective housing for a display device of a portable equipment, which can achieve the benefits of effectively protecting the display device of the portable equipment and improving user experience.

According to a first embodiment, an embodiment of the present application provides a protective housing for a display device of a portable equipment. The protective housing includes a surface cover, a surface cover plate, a frame body, a bottom case and a back plate.

Furthermore, the lower surface of the surface cover is detachably fixed with the upper end of the frame body, a waterproof adhesive tape is arranged on the periphery of the lower surface of the surface cover, the upper surface of the surface cover is fixed with the surface cover plate by injection molding, the lower end of the frame body is fixed with the upper surface of the bottom case by injection molding, the lower surface of the bottom case is fixed with the upper surface of the back plate by injection molding, the corresponding end of the frame body is fixed with an adaption interface by injection molding, the adaption interface has an inner side structure corresponding to the first connector of the display device, and the adaption interface also has an outer side structure corresponding to the second connector of a host of the portable equipment.

Preferably, the protective housing further includes a protective circuit, which includes a comparator, a relay J and a triode T.

Furthermore, the negative input end of the comparator is grounded, the positive input end of the comparator is connected with a pin of the outer side of the adaption interface, the output end of the comparator is connected with the base electrode of the triode T, the collector electrode of the triode T is connected with the U+ interface of a USB interface of the display device, the emitter electrode of the triode T is connected with one end of a coil JQ of the relay J, the other end of the coil JQ is grounded, a pin of the inner side of the adaption interface is further connected with one end of a switch JK1 of the relay, and the other end of the switch JK1 is connected with a pin of the inner side of the adaption interface.

Preferably, the protective housing further includes a protective resistor R1, the other end of the coil JQ is connected with one end of the protective resistor R1, and the other end of the protective resistor R1 is grounded.

Preferably, the protective circuit further includes an inductor L, one end of the inductor L is connected with the other end of the switch JK1, and the other end of the inductor L is connected with a pin of the inner side of the adaption interface.

Preferably, the protective housing further includes a surface cover protective film, which is arranged between the surface cover and the frame body.

According to a second embodiment, a portable equipment is provided. The portable equipment includes a display device and a host, wherein the display device and the host are detachably connected, the display device is provided with a protective housing, and the protective housing includes a surface cover, a surface cover plate, a frame body, a bottom case and a back plate.

Furthermore, the lower surface of the surface cover is detachably fixed with the upper end of the frame body, a waterproof adhesive tape is arranged on the periphery of the lower surface of the surface cover, the upper surface of the surface cover is fixed with the surface cover plate by injection molding, the lower end of the frame body is fixed with the upper surface of the bottom case by injection molding, the lower surface of the bottom case is fixed with the upper surface of the back plate by injection molding, the corresponding end of the frame body is fixed with an adaption interface by injection molding, the adaption interface has an inner side structure corresponding to the first connector of the display device, and the adaption interface has an outer side structure corresponding to the second connector of the host of the portable equipment.

Preferably, the protective housing further includes a protective circuit, which includes a comparator, a relay J and a triode T.

Furthermore, the negative input end of the comparator is grounded, the positive input end of the comparator is connected with a pin of the outer side of the adaption interface, the output end of the comparator is connected with the base electrode of the triode T, the collector electrode of the triode T is connected with the U+ interface of a USB interface of the display device, the emitter electrode of the triode T is connected with one end of a coil JQ of the relay J, the other end of the coil JQ is grounded, a pin of the inner side of the adaption interface is further connected with one end of a switch JK1 of the relay, and the other end of the switch JK1 is connected with a pin of the inner side of the adaption interface.

Preferably, the protective housing further includes a protective resistor R1, the other end of the coil JQ is connected with one end of the protective resistor R1, and the other end of the protective resistor R1 is grounded.

Preferably, the protective circuit further includes an inductor L, one end of the inductor L is connected with the other end of the switch JK1, and the other end of the inductor L is connected with a pin of the inner side of the adaption interface.

Preferably, the protective housing further includes a surface cover protective film, which is arranged between the surface cover and the frame body.

The technical scheme provided by the present application adds the adaption interface on the bottom part of the portable display device and makes the adaption interface fixed by injection molding. In this way, when the display device needs to be connected with the host of the notebook computer, the protective housing does not need to be detached, the display device may be directly electrically connected with the host of the notebook computer through the adaption interface, thus convenient use is provided for users.

BRIEF DESCRIPTION OF THE DRAWINGS

For better understanding of the technical scheme in the embodiments of the present application, accompanying drawings needed in the description of the embodiments are simply illustrated below. Obviously, the drawings described hereinafter merely illustrate some embodiments of the present invention, and for those of ordinary skill in the art, other accompanying drawings may be obtained according to these accompanying drawings without any creative work.

DESCRIPTION OF THE EMBODIMENTS

A clear and complete description as below is provided for the technical scheme in the embodiments of the present application in conjunction with the drawings in the embodiments of the present application. Obviously, the embodiments described hereinafter are simply part embodiments of the present application, but not all the embodiments. All other embodiments obtained by those of ordinary skill in the art based on the embodiments in the present application without any creative work are intended to be included in the protection scope of the present application.

The notebook computer mentioned in the present application only refers to the notebook computer whose display device (that is, display screen) may be detached to be used as a tablet computer separately.

Figure 1:
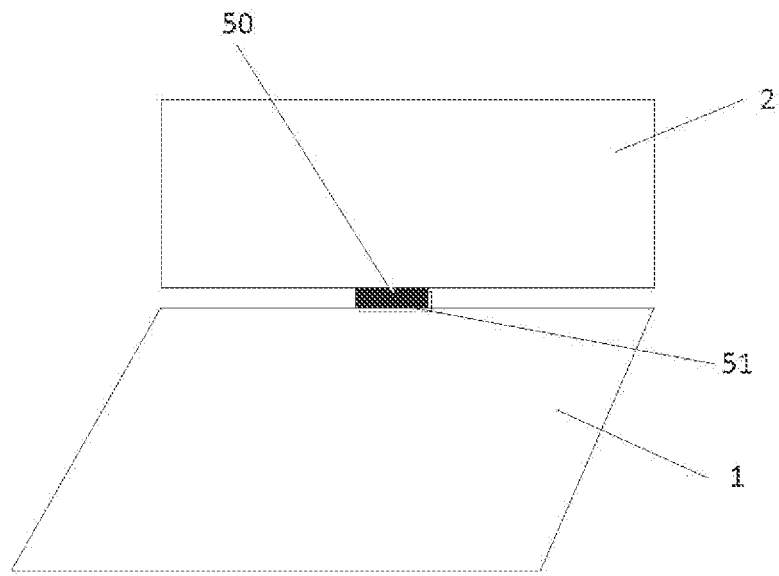
FIG. 1 is a structure diagram of a portable equipment.

Referring to FIG. 1, FIG. 1 is a structure diagram of a notebook computer. As shown in FIG. 1, the notebook computer includes a host 1 and a display device 2, wherein the host 1 and the display device 2 are in detachable fixed connection; when the host 1 and the display device 2 are fixedly connected with each other through an adaption interface, they may be used like an ordinary notebook computer (that is, a notebook computer whose display device and host cannot be detached), that is, the input mode is touch display input or keyboard input. When the display device 2 is detached from the host 1, the display device 2 may be used as a tablet computer. In order to enable users to use the display device 2 more conveniently, a protective housing can be arranged to protect the display device, however, during usage, the applicant finds that the housing body of the protective housing is of an integrated structure, particularly for the protective housing of IPv6 waterproof level. Because the housing body has integrated structure, if a user needs to install the display device on the host when he/she uses the notebook computer, the user has to detach the protective housing before electrically connecting the display device to the host, and this method is of much inconvenience and the protective housing is easy to lose. Therefore, it is necessary to provide a protective housing which is not detached from the display device meanwhile the display device may be directly connected to the host and which can achieve the IPv6 waterproof level.

Figure 2A:
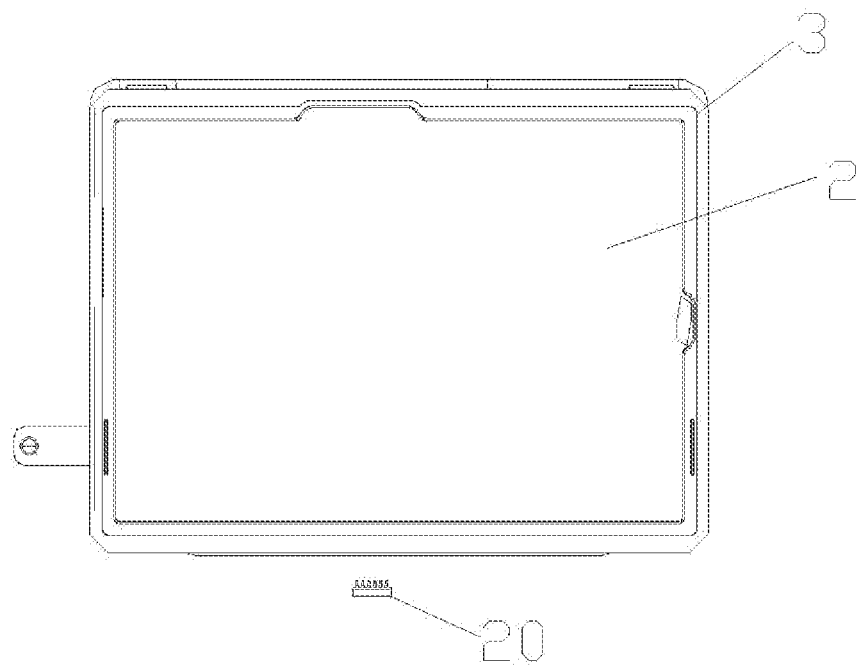
FIG. 2A is a diagram of a protective housing for a display device of a portable equipment provided by the present application.
Figure 2B:
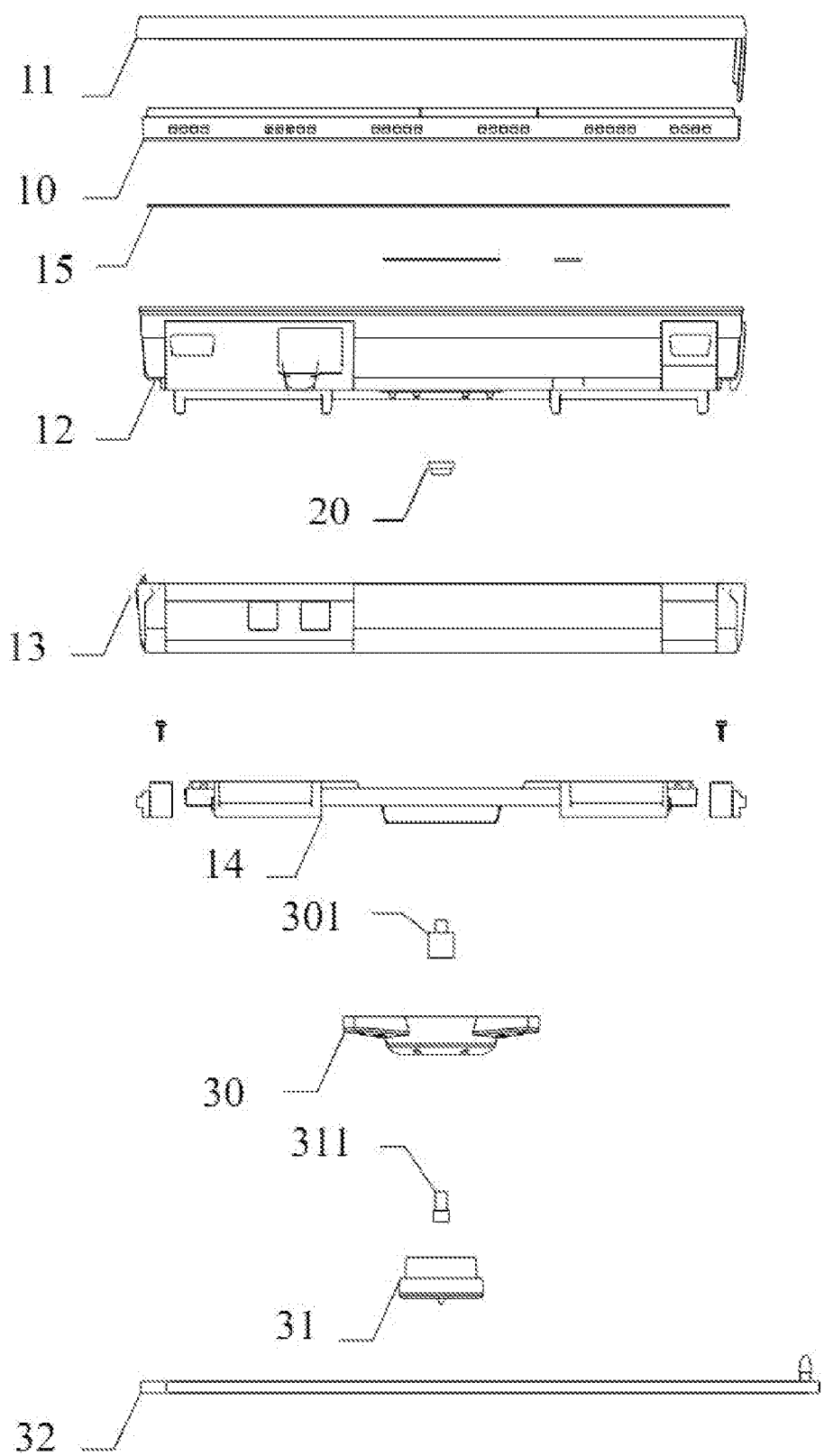
FIG. 2B is an exploded diagram of the protective housing for the display device of the portable equipment provided by the present application.

Referring to FIG. 2A, FIG. 2A shows a protective housing for a display device of a portable equipment. This protective housing can protect the display device. As shown in FIG. 2A and FIG. 2B, the protective housing 3 includes:

A surface cove 10, a surface cover plate 11, a frame body 12, a bottom case 13 and a back plate 14, wherein the lower surface of the surface cover 10 is detachably fixed with the upper end of the frame body 12, a waterproof adhesive tape is arranged on the periphery of the lower surface of the surface cover 10, the upper surface of the surface cover 10 is fixed with the surface cover plate 11 by injection molding, the lower end of the frame body 12 is fixed with the upper surface of the bottom case 13 by injection molding, the lower surface of the bottom case 13 is fixed with the upper surface of the back plate 14 by injection molding, the corresponding end of the frame body 12 is fixed with an adaption interface 20 by injection molding (for better description, the adaption interface 20 is separately shown in FIG. 2A; in actual applications, the adaption interface 20 should be fixed with the lower end of the frame body 12 by injection molding), the adaption interface 20 has an inner side structure corresponding to the first connector 50 of the display device, and the adaption interface 20 has an outer side structure corresponding to the second connector 51 of a host.

As shown in FIG. 2A and FIG. 2B, when the protective housing is provided with the adaption interface 20, the inner side of the adaption interface 20 is arranged corresponding to the first connector of the display device; after the display device is installed, the first connector is electrically connected with the inner side of the adaption interface 20; when a display device installed with the protective housing is installed on a host, the outer side of the adaption interface 20 is electrically connected with the second connector of the host, in this way, the host and the display device can be connected without detaching the protective housing, and convenient use is provided for users.

Figure 3:
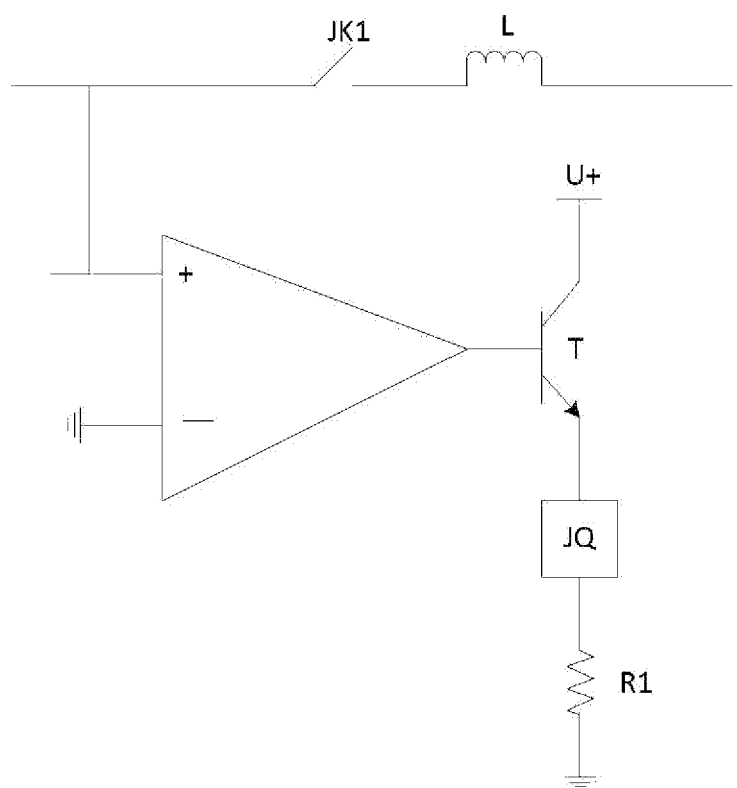
FIG. 3 is a circuit diagram of the protective circuit in the protective housing for the display device of the portable equipment provided by the present application.

The protective housing further comprises a protective circuit. As shown in FIG. 3, the protective circuit includes a comparator, a relay J and a triode T.

Furthermore, the negative input end of the comparator is grounded, the positive input end of the comparator is connected with a pin of the outer side of the adaption interface 20, the output end of the comparator is connected with the base electrode of the triode T, the collector electrode of the triode T is connected with the U+ interface of a USB interface of the display device, the emitter electrode of the triode T is connected with one end of a coil JQ of the relay J, the other end of the coil JQ is connected with one end of a protective resistor R1, and the other end of the protective resistor R1 is grounded, a pin of the inner side of the adaption interface 20 is further connected with one end of a switch JK1 of the relay, and the other end of the switch JK1 is connected with a pin of the inner side.

The working principle of the above protective circuit is as follows: in normal working, since the pin of the outer side is connected with the host, this pin is of high level; at this moment, the comparator outputs a high level, T is conducted, JQ is electrified, JK1 is closed, and the pin works normally; when the display device is placed in water, since the exposed pin of the outer side is grounded through water at such time, this pin is of low level; at this moment the positive input end and the negative input end of the comparator are basically of the same level, the comparator outputs a low level, then T is turned off, JQ is powered off and JK1 is opened, such that the pin of the inner side of the adaption interface 20 is disconnected from the pin of the outer side, avoiding that the display device is connected at this time to cause a short circuit of the multiple pins of the first connector and cause an impact on the display device.

Preferably, the protective circuit may further include an inductor L, one end of the inductor L is connected with the other end of the switch JK1, and the other end of the inductor L is connected with a pin of the inner side of the adaption interface.

The inductor L is added so as to solve the following problem: when the display device just contacts water, the voltage changes suddenly and an impulse voltage is generated; however, by this time, the comparator probably has not yet responded and JK1 is still closed; if the pin of the outer side and the pin of the inner side are directly connected at this moment, an impact will be caused on the display device, thereby damaging the display device. Therefore, the addition of the inductor L can inhibit the impulse voltage and provide a protection for the display device. In addition, in normal working, since the current and the voltage are relatively stable, the inductor L equals a short circuit, which causes no impact on the display device.

Preferably, the protective housing further includes a surface cover protective film 15, and the surface cover protective film 15 is arranged between the surface cover 10 and the frame body 12. The surface cover protective film 15 provides certain protection for the display screen of the display device.

Preferably, the lower surface of the back plate 14 is fixed with a rotating device, which includes a base 30, a rotating handle 31 and a hand strap 32. The base 30 is provided with a spindle nut 301, the rotating handle 31 is provided with a rotary screw 311 corresponding to the spindle nut 301, and the hand strap 32 is fixed onto both ends of the rotating handle 31.

The arrangement of the rotating device may allow the user to conveniently adjust the angle for holding the display device, so that it is convenient for the user to watch the display device.

The present application further provides a notebook computer. The notebook computer includes a display device and a host, wherein the display device is provided with the protective housing according to the present application.

The above is a detailed introduction for the embodiments of the present application. Specific examples are adopted in this disclosure to illustrate the principle and implementation of the present application. The description of the above embodiments is merely intended to help the understanding of the method and core idea of the present application. Meanwhile, to those of ordinary skill in the art, changes may be made to the specific implementation and the application scope according to the idea of the present application. In conclusion, the content of this description should not be understood as a limit to the present application.

What is claimed is:

1. A protective housing for a display device of a portable equipment, wherein the protective housing comprises a surface cover, a surface cover plate, a frame body, a bottom case and a back plate, wherein a lower surface of the surface cover is detachably fixed with an upper end of the frame body, a waterproof adhesive tape is arranged on the periphery of the lower surface of the surface cover, an upper surface of the surface cover is fixed on the surface cover plate by injection molding, a lower end of the frame body is fixed with an upper surface of the bottom case by injection molding, a lower surface of the bottom case is fixed with an upper surface of the back plate by injection molding, a corresponding end of the frame body is fixed with an adaption interface by injection molding, the adaption interface has an inner side structure corresponding to a first connector of the display device and an outer side structure corresponding to a second connector of a host of the portable equipment, wherein the protective housing further comprises a protective circuit which comprises a comparator, a relay J and a triode T, wherein a negative input end of the comparator is grounded, an output end of the comparator is connected with a base electrode of the triode T, a collector electrode of the triode T is connected with a U+ interface of a USB interface of the display device, an emitter electrode of the triode T is connected with one end of a coil JQ of the relay J, the other end of the coil JQ is grounded.

2. The protective housing of claim 1, wherein the protective housing further comprises a protective resistor R1, the other end of the coil JQ is connected with one end of the protective resistor R1, and the other end of the protective resistor R1 is grounded.

3. The protective housing of claim 1, wherein the protective circuit further comprises an inductor L, one end of the inductor L is connected with the other end of the switch JK1, and the other end of the inductor L is connected with a pin of the inner side of the adaption interface.

4. The protective housing of claim 1, wherein the protective housing further comprises a surface cover protective film which is arranged between the surface cover and the frame body.

5. A portable equipment comprising a display device and a host, wherein the display device is detachably connected with the host, the display device is provided with a protective housing, and the protective housing comprises a surface cover, a surface cover plate, a frame body, a bottom case and a back plate, wherein a lower surface of the surface cover is detachably fixed with an upper end of the frame body, a waterproof adhesive tape is arranged on the periphery of the lower surface of the surface cover, an upper surface of the surface cover is fixed with the surface cover plate by injection molding, a lower end of the frame body is fixed with an upper surface of the bottom case by injection molding, a lower surface of the bottom case is fixed with an upper surface of the back plate by injection molding, a corresponding end of the frame body is fixed with an adaption interface by injection molding, an inner side of the adaption interface is arranged corresponding to a first connector of the display device, and an outer side of the adaption interface is arranged corresponding to a second connector of the host of the portable equipment, wherein the protective housing further comprises a protective circuit which comprises a comparator, a relay J and a triode T, wherein a negative input end of the comparator is grounded, an output end of the comparator is connected with a base electrode of the triode T, a collector electrode of the triode T is connected with a U+ interface of a USB interface of the display device, an emitter electrode of the triode T is connected with one end of a coil JQ of the relay J, the other end of the coil JQ is grounded.

6. The portable equipment of claim 5, wherein the protective housing further comprises a protective resistor R1, the other end of the coil JQ is connected with one end of the protective resistor R1, and the other end of the protective resistor R1 is grounded.

7. The portable equipment of claim 5, wherein the protective circuit further comprises an inductor L, one end of the inductor L is connected with the other end of the switch JK1, and the other end of the inductor L is connected with a pin of the inner side of the adaption interface.

8. The portable equipment of claim 5, wherein the protective housing further comprises a surface cover protective film which is arranged between the surface cover and the frame body.

\* \* \* \* \*